Figure 8:
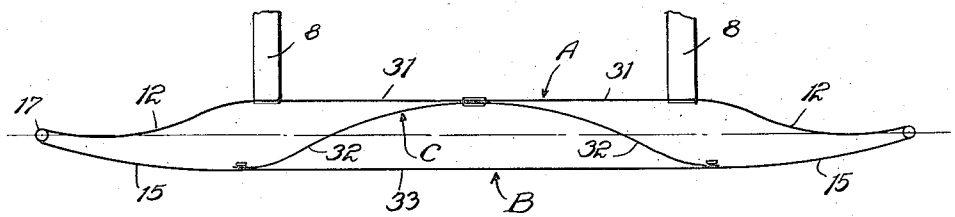

Aug. 5, 1924.
W. M. JONES
BUMPER
Filed Aug. 20, 1923
1,503,534
3 Sheets-Sheet 1
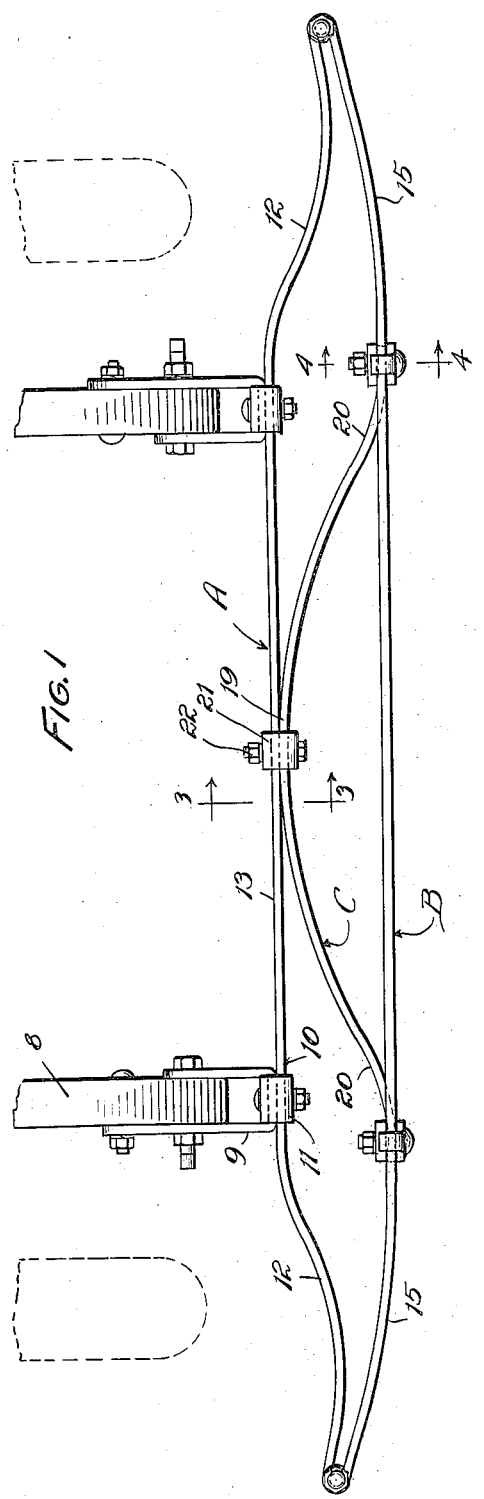
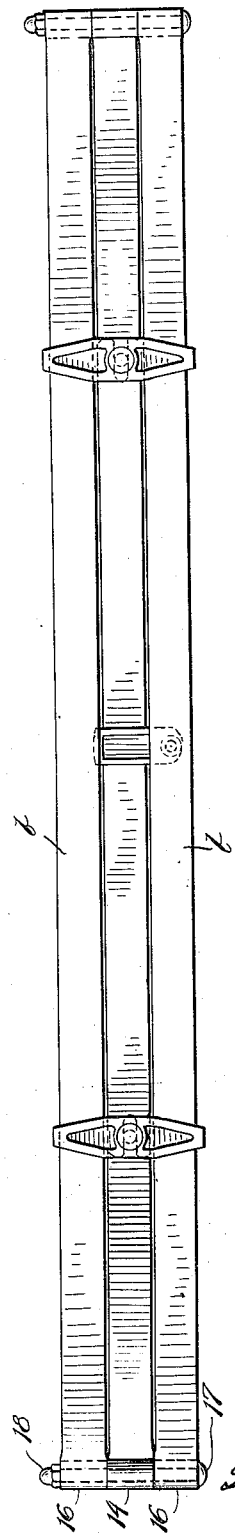

Aug. 5, 1924.
W. M. JONES
BUMPER
Filed Aug. 20, 1923
1,503,534
3 Sheets-Sheet 2
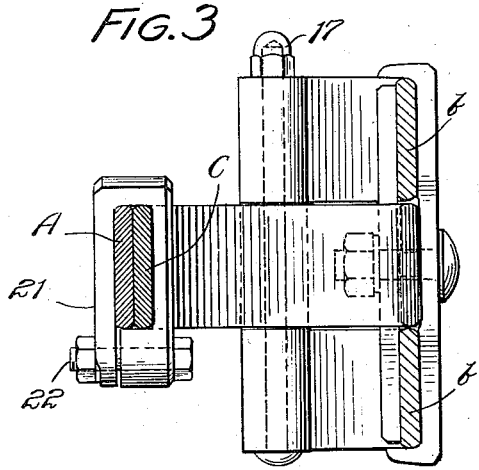
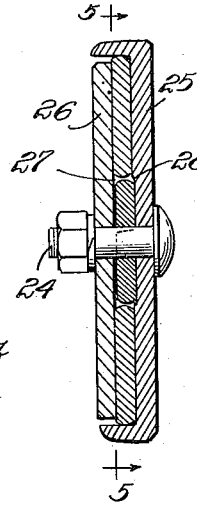
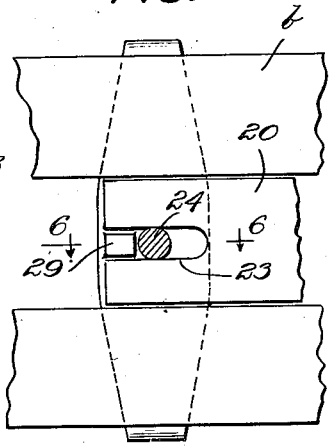
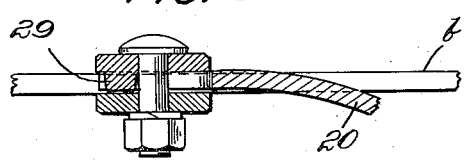
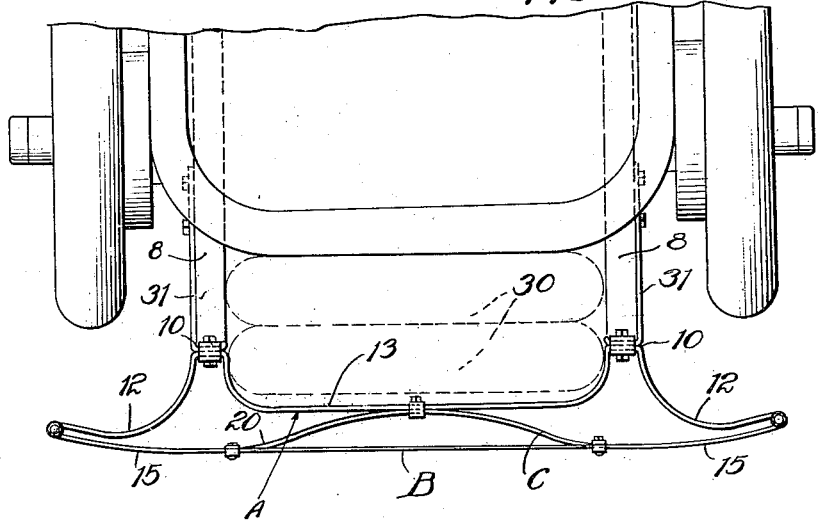
Inventor
Ward M Jones Aug. 5, 1924.

W. M. JONES

BUMPER

Filed Aug. 20, 1923

1,503,534

3 Sheets-Sheet 3

Inventor
Ward M. Jones

Patented Aug. 5, 1924.

1,503,534

UNITED STATES PATENT OFFICE.

WARD M. JONES, OF CHICAGO, ILLINOIS.

BUMPER.

Application filed August 20, 1923. Serial No. 658,330.

*To all whom it may concern:*

Be it known that I, WARD M. JONES, a citizen of the United States, residing at Chicago, in the county of Cook and State of Illinois, have invented certain new and useful Improvements in Bumpers, of which the following is a specification.

This invention relates to improvements in bumpers, more particularly for automobiles. The objects of the invention are to furnish a bumper which has greater shock absorbing qualities throughout its length and which will more effectively resist and absorb shocks given both at the ends and at the center. A further object is to have an efficient distribution of material to accomplish the above results; and further objects are simplicity of construction, freedom from rattle, a comparatively rigid structure during the normal operation of the vehicle, and to avoid bolt holes in the spring members.

I accomplish the desired stability and increase the shock absorbing qualities of the bumpers chiefly by using a half elliptic spring for the central support of the outer member.

I will now describe more fully my improved construction with reference to the accompanying drawings, in which Fig. 1 is a plan view of a front bumper attached to an automobile;

Fig. 2 is a front elevation of the bumper shown in Fig. 1;
Fig. 3 is a section on line 3—3 of Fig. 1;
Fig. 4 is a section on line 4—4 of Fig. 1;
Fig. 5 is taken on line 5—5 of Fig. 4;
Fig. 6 on line 6—6 of Fig. 5;
Fig. 7 is a plan view of a rear bumper attached to a car; and Figs. 8, 9, 10 and 11 are diagrammatic views showing the action of my bumper.

The drawings show a bumper of the double front bar and single rear bar type in which the rear or base member A is supported from the car frame members 8 by the frame clamps 9 which are bolted to the frame 8 and fastened to the support points 10 of the rear member by means of the clamp fittings 11. The member A comprises a flat bar with a portion 13 between the support points, and overhanging arms 12 which curve forwardly and back and terminate in eyes 14.
To provide wide contact surface, the outer or impact member B comprises vertically spaced bars *b* which bow back at the ends and terminate in the eyes 16.

The two members A and B are preferably joined with a hinged connection formed by the bolts 17 which are passed through the eyes 14 and 16 and tightly drawn up by the nuts 18.

The principal novelty of my invention consists of the member C which, as shown, comprises a half elliptic spring with the bowed center 19 clamped to the central point of A, and the ends 20 engaging with the member B.

The manner in which C is mounted in place is shown in Figs. 3, 4, 5, and 6. The clamp fitting 21 is drawn up by the bolt 22 and clamps the member C to the rear member A. This connection is substantially rigid but capable of yielding or being laterally displaced under extreme pressure.

The spring 20 is slotted at 23 for engagement with the bolts 24 which serve to draw the clamp plates 25 and 26 together in order to hold the bars *b* in spaced relation. These clamp plates 25 and 26 form a pocket 27 in the space between the bars *b*. To ensure freedom for lateral movement of the ends 20 in the pocket 27, the pocket is further enlarged by the recess 28 in the plate 25, and a lug 29 is provided to prevent the possibility of the plates 25 and 26 being drawn too tightly together by the bolt 24.

The members A and B are preferably shaped so that they are under no strain when they are joined together at the ends; but the member C is so shaped that it is put under a slight tension when assembled in the structure in order to put all the joints of the structure under tension to prevent rattle.

The back bumper construction is similar to the front bumper except that the support points 10 are offset inwardly from the portion 13 to allow space for spare tires 30 and at the same time to shorten the brackets 31 which secure the bumper to the frame 8.

From the foregoing it will be seen that the member C forms an effective vertical support for the impact member B, making the bumper very stable during the ordinary operation of the car.

Figure 9:
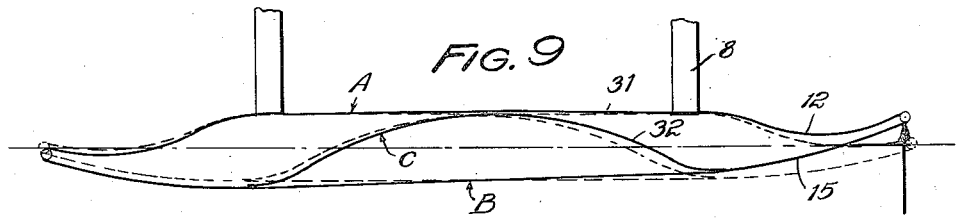
Figure 10:
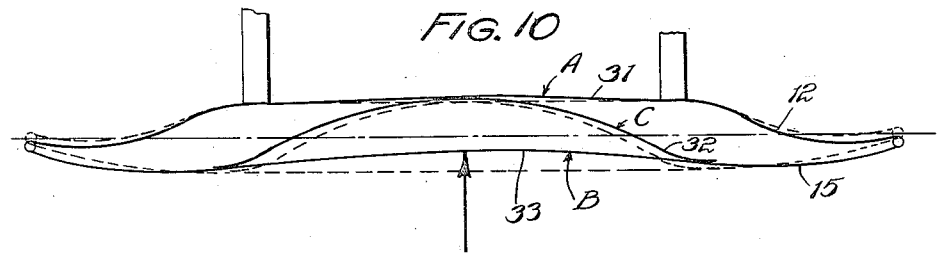

In order to more fully illustrate the action of my invention, I have shown the diagrammatic Figs. 8, 9, 10, and 11. Fig. 8 shows the parts in normal position, which position is also indicated in broken lines in the Figs. 9, 10, and 11. Fig. 9 shows, in full lines, the approximate deflection of the parts under a blow at the side, indicated by the heavy arrow; Fig. 10 shows the approximate deflection for a blow at the center; and Fig. 11 for a blow at a point between the end and the center.

Formerly bumpers of this general type have been built with no support for the impact member between its ends; or else with a comparatively rigid support generally furnished by bending the central part of the inner member forwardly and clamping it to center of the impact member.

It can readily be seen that in a bumper constructed as shown in Fig. 8, but with the member C omitted, the only effective spring resistance for a shock received at the end would be furnished almost entirely by the overhanging ends 12; and a blow at the center would be counteracted by the resiliency of the impact member and the overhanging ends, but the blow would be only weakly resisted due to long length of the impact member between the end supports.

With a rigid suport at the center as described above there would of course be no shock absorbing qualities at the center and the overhanging arm 12 would still have to do most of the work of absorbing a blow at the end.

By the insertion of the member C, as I have done, the character of the whole structure is radically changed.

Figure 11:
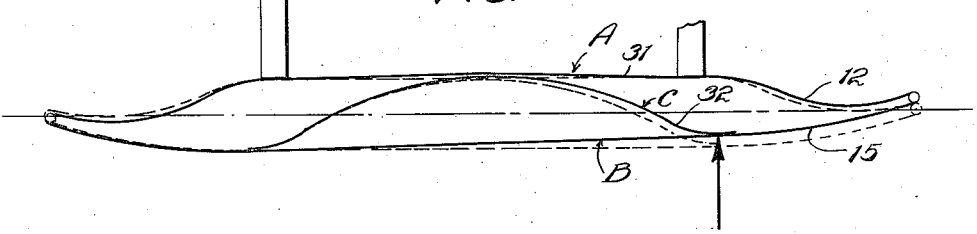

A blow at the end flexes the elements of the structure 32 12, 31, and 15 and also the corresponding elements at the opposite side. This gives the effect of a multiple leafed spring. The resistance steadily increases with the deflection, and the blow is absorbed in a gradual manner. As illustrated in Fig. 10, a central impact flexes all of the elements; and a blow received as indicated in Fig. 11 will flex the elements 12, 15, 31, and 32. In other words, the resiliency of all the parts of the different members is utilized to absorb shocks at any point.

Having thus described my invention my claims are:

1. In an automobile bumper, an inner member and an outer member in spaced relation and hinged together at the ends, the inner member being a single bar and the outer member being composed of two vertically spaced parallel bars, plates secured across the parallel bars and positioned inwardly from the ends thereof, and a half elliptic spring mounted between the inner and the outer members having its central bowed portion bearing on the mid-point of the inner member and having its ends in engagement with the said plates in the space between the parallel bars.

2. In an automobile bumper, an inner member and an outer member in spaced relation and hinged together at the ends, the inner member being a single bar and the outer member being composed of two vertically spaced parallel bars, and a half elliptic spring clamped to the mid-point of the inner member and its ends in slotted engagement with the outer member.

3. In combination in a bumper, an inner member and an outer member in spaced relation and hinged together at the ends, the inner member comprising a single bar and the outer member comprising vertically spaced parallel bars, clamps on the parallel bars positioned inward from the ends of the bars and comprising a plate in front and a plate behind the bars and held by a bolt which is located in the space between the bars, and a half elliptic spring clamped at its center to the mid point of the inner bar and having its ends in horizontally slotted engagement with the said clamp bolts.

WARD M. JONES.